(12) United States Patent
Rothkopf et al.

(10) Patent No.: US 8,816,977 B2
(45) Date of Patent: Aug. 26, 2014

(54) ELECTRONIC DEVICES WITH FLEXIBLE DISPLAYS

(75) Inventors: Fletcher R. Rothkopf, Los Altos, CA (US); Scott A. Myers, San Francisco, CA (US); Stephen Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 13/171,295

(22) Filed: Jun. 28, 2011

(65) Prior Publication Data

US 2012/0242592 A1 Sep. 27, 2012

Related U.S. Application Data

(60) Provisional application No. 61/454,894, filed on Mar. 21, 2011.

(51) Int. Cl.
*G06F 3/045* (2006.01)
*G06F 3/02* (2006.01)
*G09G 5/00* (2006.01)
*G09G 3/34* (2006.01)

(52) U.S. Cl.
USPC ........... 345/173; 345/174; 345/169; 345/156; 345/108

(58) Field of Classification Search
USPC ........ 345/173, 174, 169, 156, 108; 340/407.2
See application file for complete search history.

(56) References Cited

U.S. PATENT DOCUMENTS

| 4,066,855 | A | 1/1978 | Zenk |
| 4,085,302 | A | 4/1978 | Zenk et al. |
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,067,074 | A | 5/2000 | Lueders |

(Continued)

FOREIGN PATENT DOCUMENTS

| EP | 0929027 | 7/1999 |
| EP | 1 635 313 | 3/2006 |

(Continued)

OTHER PUBLICATIONS

Takamatsu et al., "Transparent conductive-polymer strain sensors for touch input sheets of flexible displays" Journal of Micromechanics and Microengineering, J. Micromech. Microeng. 20 (2010) 075017 (6pp).

(Continued)

*Primary Examiner* — Kent Chang
*Assistant Examiner* — Nelson Rosario
(74) *Attorney, Agent, or Firm* — Treyz Law Group; Kendall P. Woodruff

(57) ABSTRACT

Electronic devices may be provided that contain flexible displays and internal components. An internal component may be positioned under the flexible display. The internal component may be an output device such as a speaker that transmits sound through the flexible display or an actuator that deforms the display in a way that is sensed by a user. The internal component may also be a microphone or pressure sensor that receives sound or pressure information through the flexible display. Structural components may be used to permanently or temporarily deform the flexible display to provide tactile feedback to a user of the device.

9 Claims, 16 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 6,803,245 B2 | 10/2004 | Auch et al. |
| 6,879,319 B2 | 4/2005 | Cok |
| 7,015,894 B2 | 3/2006 | Morohoshi |
| 7,034,913 B2 | 4/2006 | Ishida |
| 7,184,064 B2 | 2/2007 | Zimmerman et al. |
| 7,188,989 B2 | 3/2007 | Miyashita |
| 7,324,093 B1 | 1/2008 | Gettemy et al. |
| 7,382,357 B2 * | 6/2008 | Panotopoulos et al. ....... 345/168 |
| 7,382,890 B2 | 6/2008 | Saiki |
| 7,541,671 B2 | 6/2009 | Foust et al. |
| 7,663,607 B2 | 2/2010 | Hotelling et al. |
| 7,714,801 B2 | 5/2010 | Kimmel |
| 7,834,451 B2 | 11/2010 | Lee et al. |
| RE42,199 E | 3/2011 | Caldwell |
| 7,920,223 B2 | 4/2011 | Nishizawa et al. |
| 8,027,503 B2 * | 9/2011 | Konuma et al. ............... 381/400 |
| 8,199,124 B2 * | 6/2012 | Ciesla et al. ................. 345/173 |
| 2002/0001187 A1 | 1/2002 | Murofushi |
| 2002/0071082 A1 | 6/2002 | Okita et al. |
| 2003/0003879 A1 * | 1/2003 | Saiki et al. ...................... 455/90 |
| 2003/0227441 A1 | 12/2003 | Hioki et al. |
| 2005/0025330 A1 * | 2/2005 | Saiki et al. ................... 381/388 |
| 2005/0140646 A1 | 6/2005 | Nozawa |
| 2005/0226455 A1 | 10/2005 | Aubauer et al. |
| 2006/0026521 A1 | 2/2006 | Hotelling et al. |
| 2006/0132025 A1 | 6/2006 | Gao et al. |
| 2006/0197753 A1 | 9/2006 | Hotelling |
| 2006/0238494 A1 | 10/2006 | Narayanaswami et al. |
| 2006/0273304 A1 * | 12/2006 | Cok ................................ 257/40 |
| 2007/0202917 A1 | 8/2007 | Phelps et al. |
| 2007/0242033 A1 | 10/2007 | Cradick et al. |
| 2007/0247422 A1 | 10/2007 | Vertegaal et al. |
| 2007/0247429 A1 * | 10/2007 | Westerman .................. 345/168 |
| 2007/0258604 A1 | 11/2007 | Bosnecker |
| 2008/0060856 A1 * | 3/2008 | Shahoian et al. .......... 178/18.03 |
| 2008/0260188 A1 * | 10/2008 | Kim .............................. 381/190 |
| 2008/0305838 A1 | 12/2008 | Joo |
| 2009/0015747 A1 | 1/2009 | Nishizawa et al. |
| 2009/0082103 A1 | 3/2009 | Lube |
| 2009/0161048 A1 | 6/2009 | Satake et al. |
| 2009/0167171 A1 | 7/2009 | Jung et al. |
| 2009/0201443 A1 | 8/2009 | Sasaki et al. |
| 2009/0219247 A1 | 9/2009 | Watanabe et al. |
| 2009/0256471 A1 | 10/2009 | Kim et al. |
| 2010/0006845 A1 | 1/2010 | Seo et al. |
| 2010/0026952 A1 | 2/2010 | Miura et al. |
| 2010/0045705 A1 | 2/2010 | Vertegaal et al. |
| 2010/0052521 A1 | 3/2010 | Kim et al. |
| 2010/0073593 A1 | 3/2010 | Sasaki |
| 2010/0110041 A1 | 5/2010 | Jang |
| 2010/0162109 A1 * | 6/2010 | Chatterjee et al. ............ 715/702 |
| 2010/0164888 A1 | 7/2010 | Okumura |
| 2010/0238367 A1 | 9/2010 | Montgomery et al. |
| 2010/0238612 A1 | 9/2010 | Hsiao et al. |
| 2010/0260351 A1 * | 10/2010 | Diethorn et al. ................ 381/93 |
| 2010/0265187 A1 | 10/2010 | Chang et al. |
| 2010/0315399 A1 | 12/2010 | Jacobson et al. |
| 2010/0317409 A1 * | 12/2010 | Jiang et al. ..................... 455/566 |
| 2011/0037734 A1 | 2/2011 | Wilson et al. |
| 2011/0086680 A1 | 4/2011 | Kim et al. |
| 2011/0186899 A1 * | 8/2011 | Van Lieshout ................ 257/99 |
| 2011/0234502 A1 * | 9/2011 | Yun et al. ...................... 345/173 |
| 2012/0111479 A1 | 5/2012 | Musser et al. |
| 2012/0127087 A1 | 5/2012 | Ma |
| 2012/0211148 A1 | 8/2012 | Patel et al. |
| 2012/0218219 A1 | 8/2012 | Rappoport et al. |
| 2013/0135212 A1 * | 5/2013 | Cheng et al. ................. 345/168 |

FOREIGN PATENT DOCUMENTS

| | | |
|---|---|---|
| EP | 1635313 | 3/2006 |
| EP | 1827057 | 8/2007 |
| EP | 1 970 886 | 9/2008 |
| EP | 1970886 | 9/2008 |
| EP | 2 192 750 | 6/2010 |
| EP | 2192750 | 6/2010 |
| EP | 2202624 | 6/2010 |
| JP | H6-66969 | 3/1994 |
| JP | Hei 6-66969 | 3/1994 |
| JP | 2010171620 | 6/1998 |
| JP | 20000163031 | 6/2000 |
| JP | 2000-293117 | 10/2000 |
| JP | 2000293117 | 10/2000 |
| JP | 2001061194 | 3/2001 |
| JP | 2001-154592 | 6/2001 |
| JP | 2001154592 | 6/2001 |
| JP | 2001189978 | 7/2001 |
| JP | 2002232992 | 8/2002 |
| JP | 2002342033 | 11/2002 |
| JP | 200315795 | 1/2003 |
| JP | 2003125315 | 4/2003 |
| JP | 2003179988 | 6/2003 |
| JP | 2003211087 | 7/2003 |
| JP | 2008283350 | 7/2003 |
| JP | 2003-208548 | 10/2003 |
| JP | 2003208548 | 10/2003 |
| JP | 2003280546 | 10/2003 |
| JP | 2004173264 | 6/2004 |
| JP | 2005-091873 | 4/2005 |
| JP | 2005110216 | 4/2005 |
| JP | 2007-272107 | 10/2007 |
| JP | 2008233779 | 10/2008 |
| JP | 2008283350 | 11/2008 |
| JP | 2010-008480 | 1/2010 |
| JP | 2010-191246 | 9/2010 |
| WO | 02095342 | 11/2002 |
| WO | 2007082114 | 7/2007 |

OTHER PUBLICATIONS

Bhattacharya et al., "Organic LED Pixel Array on a Dome" The IEEE, vol. 93, No. 7, Jul. 2005.

Stedmon et al., "Sound and Tangible Interfaces for Novel product design" Satin, Nov. 2007.

Wagner et al., "Flexible thin-film transistor backplanes" Department of Electrical Engineering, and Princeton Institute for the Science and Technology of Materials.

Chen et al., U.S. Appl. No. 13/186,238, filed Jul. 19, 2011.

Myers et al., U.S. Appl. No. 13/108,256, filed May 16, 2011.

Lynch, U.S. Appl. No. 13/184,303, filed Jul. 15, 2011.

Drzaic et al., U.S. Appl. No. 13/252,971, filed Oct. 4, 2011.

Franklin et al., U.S. Appl. No. 13/250,227, filed Sep. 30, 2011.

Franklin et al., U.S. Appl. No. 13/250,666, filed Sep. 30, 2011.

Franklin et al., U.S. Appl. No. 13/310,409, filed Dec. 2, 2011.

Franklin et al., U.S. Appl. No. 13/422,724, filed Mar. 16, 2012.

Martisauskas et al., U.S. Appl. No. 13/229,120, filed Sep. 9, 2011.

Myers et al., U.S. Appl. No. 13/246,510, filed Sep. 27, 2011.

Raff et al., U.S. Appl. No. 13/452,061, filed Apr. 20, 2012.

Rappoport et al., U.S. Appl. No. 13/249,734, filed Sep. 30, 2011.

Rappoport et al., U.S. Appl. No. 13/273,851, filed Oct. 14, 2011.

Rothkopf et al., U.S. Appl. No. 13/177,165, filed Jul. 6, 2011.

Concise Description of Relevance of Japanese Patent Publication No. JP 2000-293117 Submitted Under 35 U.S.C. § 122(E) and 37 C.F.R. § 1.290 submitted Mar. 19, 2013, for U.S. Appl. No. 13/184,303, filed Jul. 15, 2011, 3 pages.

Patent Cooperation Treaty Third Party Observation submitted Jun. 14, 2013, for International Patent Application No. PCT/2012/029844 filed on Mar. 20, 2012, 6 pages.

Patent Cooperation Treaty Third Party Observation submitted Jun. 14, 2013, for International Patent Application No. PCT/2012/029844 filed on Mar. 20, 2012, 4 pages.

Patent Cooperation Treaty Third Party Observation submitted Jun. 14, 2013, for International Patent Application No. PCT/2012/029844 filed on Mar. 20, 2012, 3 pages.

(56) References Cited

OTHER PUBLICATIONS

Concise Description of Relevance of Japanese Patent Publication No. JP 2001-154592 Submitted Under 35 U.S.C. § 122(E) and 37 C.F.R. § 1.290 submitted Mar. 19, 2013, for U.S. Appl. No. 13/184,303, filed Jul. 15, 2011, 5 pages.

Concise Description of Relevance of Japanese Patent Publication No. HEI6-66969 Submitted Under 35 U.S.C. § 122(E) and 37 C.F.R. § 1.290 submitted Mar. 19, 2013, U.S. Appl. No. 13/184,303, filed Jul. 15, 2011, 3 pages.

Concise Description of Relevance of Japanese Patent Publication No. JP 2003-280548 Submitted Under 35 U.S.C. § 122(E) and 37 C.F.R. § 1.290 submitted Mar. 19, 2013, U.S. Appl. No. 13/184,303, filed Jul. 15, 2011, 4 pages.

Concise Description of Relevance of Japanese Patent Publication No. JP 2010-008480 Submitted Under 35 U.S.C. § 122(E) and 37 C.F.R. § 1.290 submitted Mar. 19, 2013, U.S. Appl. No. 13/184,303, filed Jul. 15, 2011, 5 pages.

Concise Description of Relevance of Japanese Patent Publication No. JP 2010-171620 Submitted Under 35 U.S.C. § 122(E) and 37 C.F.R. § 1.290 submitted Oct. 3, 2013, U.S. Appl. No. 13/250,227, filed Sep. 30, 2011, 5 pages.

Concise Description of Relevance of Japanese Patent Publication No. JP 2008-233779 Submitted Under 35 U.S.C. § 122(E) and 37 C.F.R. § 1.290 submitted Oct. 3, 2013, U.S. Appl. No. 13/250,227, filed Sep. 30, 2011, 5 pages.

Concise Description of Relevance of Japanese Patent Publication No. JP 2002-0071082 Submitted Under 35 U.S.C. § 122(E) and 37 C.F.R. § 1.290 submitted Oct. 3, 2013, for U.S. Appl. No. 13/250,227, filed Sep. 30, 2011, 5 pages.

Concise Description of Relevance of Japanese Patent Publication No. JP 2003-15795 Submitted Under 35 U.S.C. § 122(E) and 37 C.F.R. § 1.290 submitted Oct. 3, 2013, U.S. Appl. No. 13/250,227, filed Sep. 30, 2011, 7 pages.

* cited by examiner

ELECTRONIC DEVICES WITH FLEXIBLE DISPLAYS

This application claims the benefit of provisional patent application No. 61/454,894, filed Mar. 21, 2011, which is hereby incorporated by reference herein in its entirety.

BACKGROUND

This relates generally to flexible displays, and more particularly, to electronic devices with flexible displays.

Electronic devices such as portable computers and cellular telephones are often provided with rigid displays made from rigid display structures. For example, a liquid crystal display (LCD) may be formed from a stack of rigid display structures such as a thin-film transistor layer with display pixels for providing visual feedback to a user, a color filter layer for providing the display pixels with color, a touch screen panel for gathering touch input from a user, and a cover glass layer for protecting the display and internal components.

Conventional devices may also have input-output components such as buttons, microphones, speakers, and other components. Openings are commonly formed in the housing of a conventional device to accommodate operation of these input-output components. For example, openings may be formed in a device housing to accommodate speaker and microphone ports and openings may be formed in a display cover glass layer to accommodate a speaker port and menu button.

The inclusion of these openings to accommodate input-output components may not be desirable. For example, the presence of openings may be aesthetically unappealing, may raise the risk of damage from environmental exposure, and may reduce the amount of active display area that is available to display images for a user.

It would therefore be desirable to be able to provide improved electronic devices.

SUMMARY

Electronic devices may be provided with flexible displays. The flexible displays may be composed of one or more flexible layers and may be mounted on top of or under a cover layer. For example, a flexible display may be mounted on top of a rigid support member or may be mounted on the underside of a rigid cover layer.

Electronic devices may also be provided with user interface components (input-output components) such as buttons, microphones, speakers, piezoelectric actuators (for receiving electrical input from a user or tactile feedback to users), or other actuators such as vibrators, pressure sensors, and other components. These components may be mounted under portions of a flexible display.

During operation of the electronic device, the flexibility of the display may allow a user to interact with the component through the display. For example, sound waves from a speaker or localized vibrations from an actuator in an electronic device may pass through the flexible display. The flexible display may also allow an internal microphone, pressure sensor, or force sensor (or other internal components) to receive external input. For example, a user may deflect a flexible display using a finger or other external object, barometric pressure may be monitored through the flexible display, or sound waves may be received through the flexible display.

Components may receive input or may supply output through a physically deformed portion of the flexible display (e.g., a deformation that occurs when a user presses on the display to compress the component). In some configurations, a portion of the flexible display may serve as a membrane that forms part of a microphone, speaker, pressure sensor, or other electronic component.

The ability of a user to compress a component such as a button switch by deforming the flexible display may allow the area of a device available for visual display to be enlarged. For example, the active area of a flexible display may overlap a component such as a button or speaker.

If desired, a flexible display may be deformed by an internal component to provide audio or tactile feedback to a user. For example, structures inside an electronic device may be pressed against portions of a flexible display to temporarily create an outline for a virtual on-screen button or to temporarily create a grid of ridges that serve to delineate the locations of keys in a keyboard (keypad).

Further features of the invention, its nature and various advantages will be more apparent from the accompanying drawings and the following detailed description of the preferred embodiments.

DETAILED DESCRIPTION

An electronic device may be provided with a flexible display and user interface components. User interface components may include buttons, switches, microphones, actuators such as solenoids, motors, and piezoelectric actuators, connector ports, touch screens, proximity sensors and other components for accepting input from, or transmitting information to, a user or the surrounding environment.

Flexible displays may be formed from flexible layers such as a flexible display layer (e.g., a flexible organic light-emitting diode array), a flexible touch-sensitive layer (e.g., a sheet of polymer with an array of transparent capacitor electrodes for a capacitive touch sensor), a flexible substrate layer, etc. These flexible layers may, if desired, be covered by a flexible or rigid cover layer (sometimes referred to as a cover glass) or may be supported by a support structure (e.g., a rigid support structure on the underside of the flexible layers). In electronic devices with flexible displays that are covered by rigid cover layers, the cover layers may be provided with openings that provide access to the flexible layers of the display in the vicinity of a user interface device. For example, a cover glass layer may have an opening that allows a button member to move relative to the cover glass layer. As the button member moves within the opening, underlying portions of the flexible display may be deformed (e.g., to allow actuation of an associated switch).

To maximize the area of the portion of the flexible display that is available for displaying visual information to the user, user interface components may be positioned behind, abutted against or integrated into the flexible display. The deformable nature of the flexible display may allow a user to interact with the user interface components (input-output components) by moving the display into contact with the user interface components or by otherwise allowing the display to locally flex (e.g., to allow sound to pass through the flexible display or to allow a barometric pressure measurements of the exterior environment to be made by an internal pressure sensor). If desired, a portion of the flexible display may form a membrane portion of an electrical component. Components that may be provided with a membrane that is formed from a portion of a flexible display include microphones, laser microphones, pressure sensors, speakers, etc.

Figure 1:
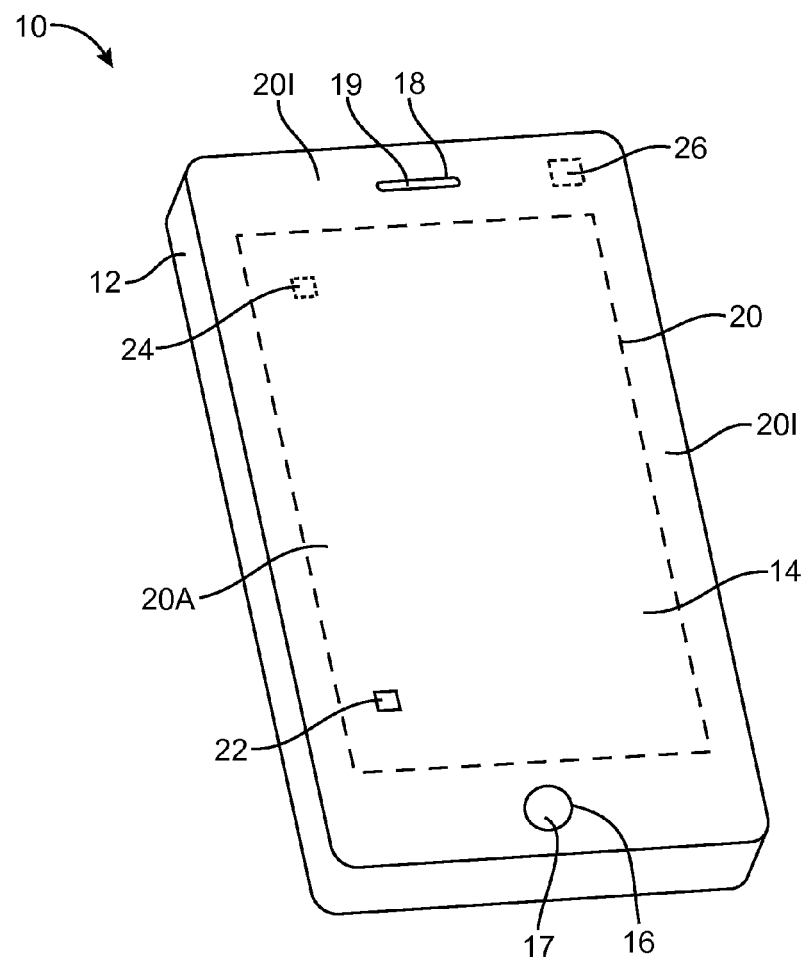
FIG. 1 is a perspective view of an illustrative electronic device with a flexible display and internal components in accordance with an embodiment of the present invention.

An illustrative electronic device of the type that may be provided with a flexible display is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a flexible display such as flexible display 14. Flexible display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array. Other types of flexible display pixel arrays may also be formed (e.g., electronic ink displays, etc.). The use of OLED technology to form flexible display 14 is sometimes described herein as an example. This is, however, merely illustrative. Flexible display 14 may be formed using any suitable flexible display technology. The use of flexible displays that are based on OLED technology is merely illustrative.

In addition to these functional display layers (i.e., the OLED array and the optional touch sensor array), display 14 may include one or more structural layers. For example, display 14 may be covered with a flexible or rigid cover layer and/or may be mounted on a support structure (e.g., a rigid support). Layers of adhesive may be used in attaching flexible display layers to each other and may be used in mounting flexible display layers to rigid and flexible structural layers.

In configurations for display 14 in which the cover layer for display 14 is flexible, input-output components that rely on the presence of flexible layers may be mounted at any suitable location under the display (e.g., along peripheral portions of the display, in a central portion of the display, etc.). In configurations for display 14 in which the flexible layers are covered by a rigid cover glass layer or other rigid cover layer, the rigid layer may be provided with one or more openings and the electronic components may be mounted under the openings. For example, a rigid cover layer may have openings such as a circular opening 16 for button 17 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

In some embodiments, portions of flexible display 14 such as peripheral regions 20I may be inactive and portions of display 14 such as rectangular central portion 20A (bounded by dashed line 20) may correspond to the active part of display 14. In active display region 20A, an array of image pixels may be used to present text and images to a user of device 10. In active region 20A, display 14 may include touch sensitive components for input and interaction with a user of device 10. If desired, regions such as regions 20I and 20A in FIG. 1 may both be provided with display pixels (i.e., all or substantially all of the entire front planar surface of a device such as device 10 may be covered with display pixels).

Device 10 may, if desired, have internal user interface components such as buttons 17 or speaker component 19 that occupy openings such as openings 16 and 18 respectively in an optional rigid cover layer of flexible display 14. Buttons 17 may be based on dome switches or other switch circuitry. Buttons 17 may include button members that form push buttons (e.g., momentary buttons), slider switches, rocker switches, etc. Device 10 may include internal structural components such as structural component 22 that add a raised structure to a portion of flexible display 14. Device 10 may include components such as interface components 24 and 26 that may be fully internal to device 10, but that receive input from the user or from the surrounding environment through physical interaction with flexible display 14. Interface components 22, 24, and 26 may be positioned in active region 20A or inactive region 20I of flexible display 14. Interface components 22, 24, and 26 may be positioned separately from one another or may be commonly located to form a combined component with structural and internal features. Interface components 24 and 26 may be positioned underneath flexible display 14 so that flexible display 14 must be deformed in order to contact components 24 or 26 or, if desired may be positioned to remain in constant contact with flexible display 14.

Figure 2:
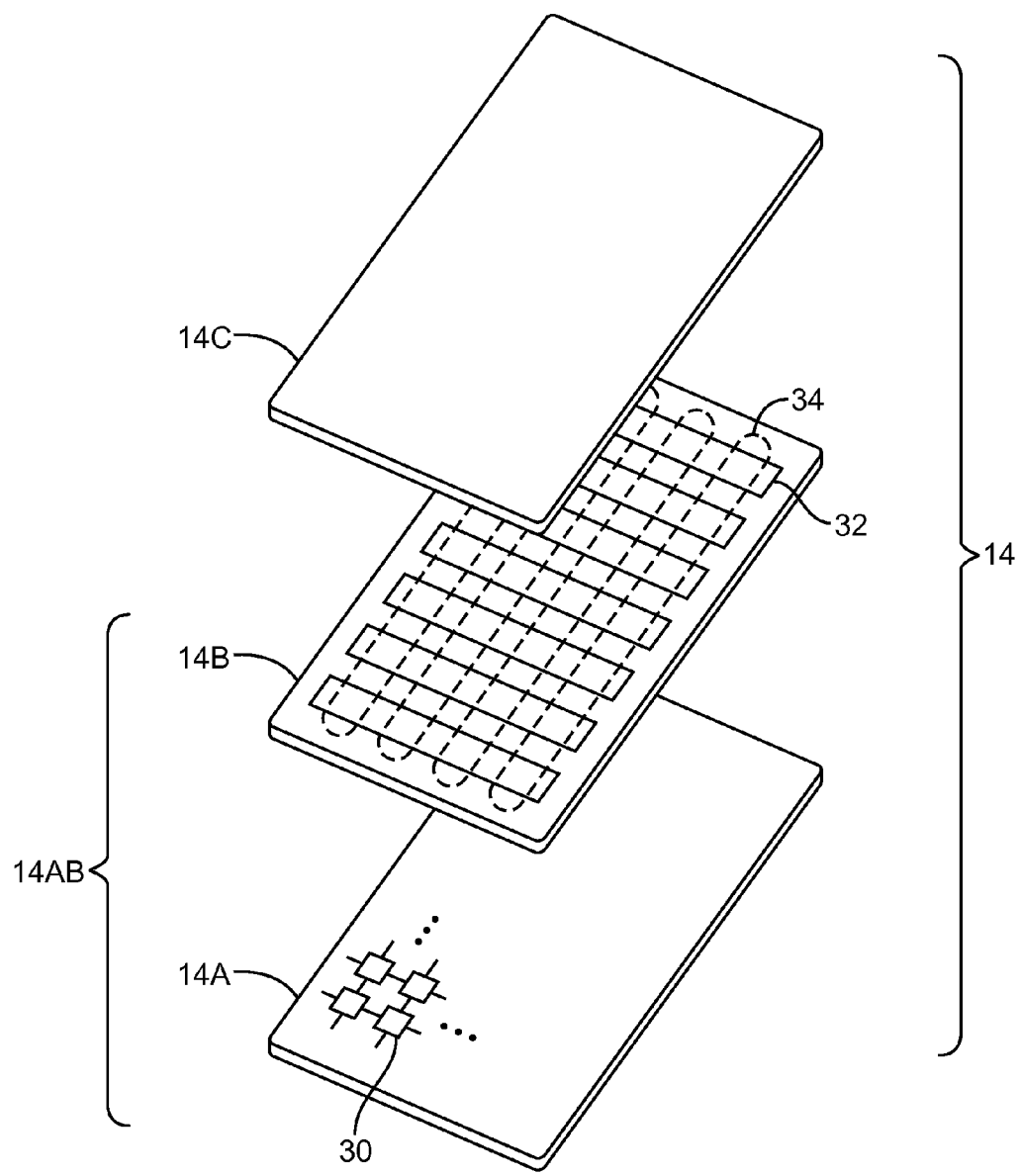
FIG. 2 is a diagram of an illustrative set of display layers that may be used to form a flexible display in accordance with an embodiment of the present invention.

An exploded perspective view of an illustrative display is shown in FIG. 2. As shown in FIG. 2, flexible display 14 may be formed by stacking multiple layers including flexible display layer 14A, touch-sensitive layer 14B, and cover layer 14C. Flexible display 14 may also include other layers of material such as adhesive layers, optical films, or other suitable layers. Flexible display layer 14A may include image pixels formed form light-emitting diodes (LEDs), organic LEDs (OLEDs), plasma cells, electronic ink elements, liquid crystal display (LCD) components, or other suitable image pixel structures compatible with flexible displays.

Touch-sensitive layer 14B may incorporate capacitive touch electrodes such as horizontal transparent electrodes 32 and vertical transparent electrodes 34. Touch-sensitive layer 14B may, in general, be configured to detect the location of one or more touches or near touches on touch-sensitive layer 14B based on capacitive, resistive, optical, acoustic, inductive, or mechanical measurements, or any phenomena that can be measured with respect to the occurrences of the one or more touches or near touches in proximity to touch sensitive layer 14B.

Software and/or hardware may be used to process the measurements of the detected touches to identify and track one or more gestures. A gesture may correspond to stationary or non-stationary, single or multiple, touches or near touches on touch-sensitive layer 14B. A gesture may be performed by moving one or more fingers or other objects in a particular manner on touch-sensitive layer 14B such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Cover layer 14C may be formed from plastic or glass (sometimes referred to as display cover glass) and may be flexible or rigid. If desired, the interior surface of peripheral inactive portions 20I of cover layer 14C may be provided with an opaque masking layer on such as black ink.

Touch-sensitive flexible display section 14AB may be formed from display pixel array layer 14A and optional touch sensor layer 14B.

Figure 3:
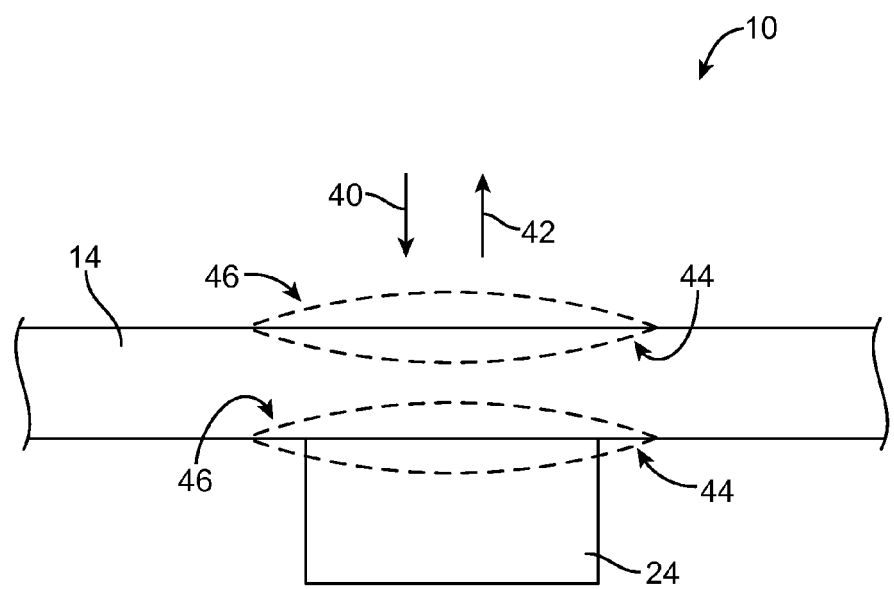
FIG. 3 is a cross-sectional side view of a portion of an illustrative electronic device in the vicinity of an internal user interface component in accordance with an embodiment of the present invention.

FIG. 3 is a cross-sectional side view of a portion of flexible display 14 in the vicinity of internal user interface component 24. Flexible display 14 may be deformed away from its natural shape under pressure. For example, flexible display 14 may be deflected by pressure exerted by a user or by other external forces in direction 40. As shown in FIG. 3, pressure in direction 40 may cause flexible display 40 to deform as indicated by dashed lines 44. Internal component 24 may be configured to receive input due to deformation of flexible display 14. Internal component 24 may also provide a temporary return (restoring) pressure in direction 42.

Pressure in direction 42 may cause flexible display 14 to temporarily deform outward of device 10 as indicated by dashed lines 46. Pressure in direction 42 may, if desired, be formed by an internal actuator that deforms display 14 to provide a desired tactile sensation on the surface of display 14 to a user of device 10. Flexible display 14 may have a natural resiliency that, following deformation as indicated by dashed lines 44, causes flexible display to temporarily deform outward of device 10 as indicated by dashed lines 46 before returning to its natural shape. Internal component 24 may be a button, an actuator such as a motor, solenoid, vibrator, or piezoelectric actuator, a pressure sensor, an audio component such as a microphone or speaker, or other component. Because display 14 is flexible, these components may operate effectively, even when covered by display 14. For example, audio components such as microphones and speakers may receive and transmit sound through flexible display 14. A barometric pressure sensor or a force sensor may also receive input through flexible display 14. Components such as actuators may be used to temporarily create raised ridges or other external features on the surface of the flexible display (e.g., to indicate to a user where an on-screen button or group of buttons is located). The portion of display 14 under which components 24 are mounted may be active (i.e., a portion of the display that contains OLED pixels or other display pixels) or inactive (i.e., a peripheral portion of the display outside of the active region).

Figure 4:
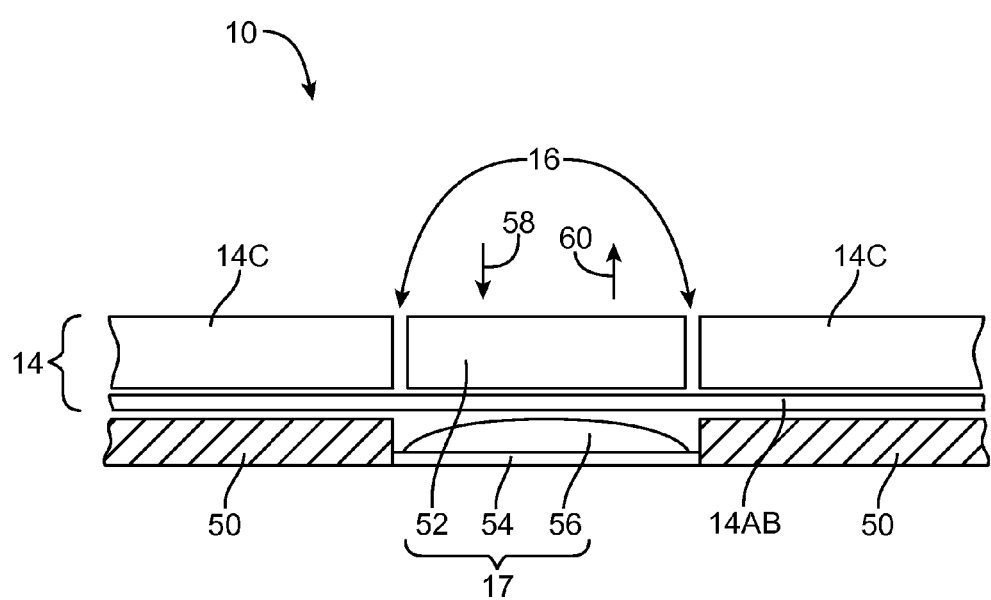
FIG. 4 is a cross-sectional side view of a portion of an illustrative electronic device in the vicinity of a button in accordance with an embodiment of the present invention.

FIG. 4 is a cross-sectional side view of a portion of device 10 in the vicinity of button 17 of device 10. As shown in FIG. 4, button 17 may have a button member such as button member 52 that reciprocates within opening 16 of cover layer 14C. When a user presses the exterior of button member 52 in direction 58, button member 52 may press against touch-sensitive flexible display section (layer) 14AB. Touch-sensitive flexible display section 14AB may be deformed to depress a dome switch such as dome switch 56 or other switch mechanism, thereby activating the switch (e.g., shorting internal switch terminals together to close the switch). Dome switches such as dome switch 56 may, if desired, be mounted to printed circuits such as printed circuit 54. Dome switch 56 may have a dome-shaped biasing member that pushes touch-sensitive flexible display section 14AB outward in direction 60 when the user releases pressure from button member 52. Dome switch 54 and printed circuit 54 may be recessed in a support structure such as support structure 50 behind flexible display 14. Other types of switches may used if desired, such as switches with spring-based biasing members or other biasing structures that bias button members such as button member 52. The use of a dome switch with a dome-shaped biasing structure is merely illustrative.

Figure 5:
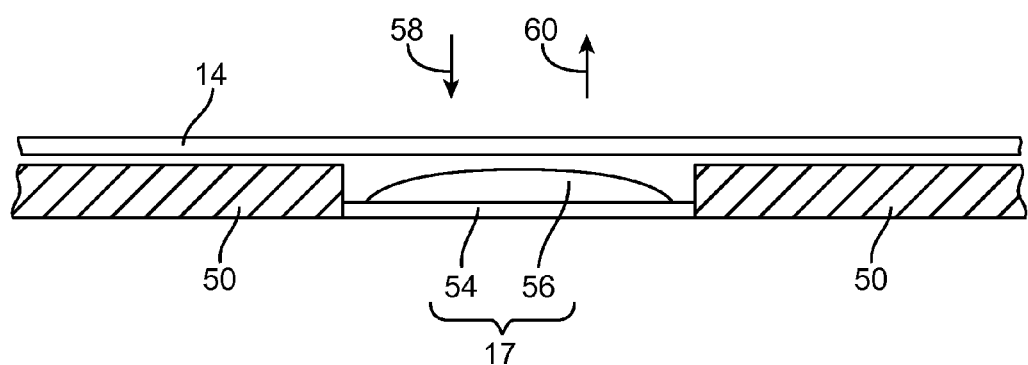
FIG. 5 is a cross-sectional side view of another embodiment of a portion of an illustrative electronic device in the vicinity of a button in accordance with an embodiment of the present invention.

FIG. 5 is a cross-sectional side view of a portion of device 10 in the vicinity of button 17 of device 10. The illustrative embodiment of FIG. 5 differs from the illustrative embodiment of FIG. 4 in that cover layer 14C of flexible display 14 is not a rigid cover layer, but a flexible cover layer. In an embodiment in which flexible display 14 contains a flexible cover layer 14C, button 17 includes dome switch 56 and printed circuit 54. In the embodiment of FIG. 5, a user may press the exterior of flexible display 14 in direction 58. Flexible display 14 may be deformed to depress dome switch 56 or other switch mechanism, thereby activating the switch. As in FIG. 4, dome switches such as dome switch 56 may, if desired, be mounted to printed circuits such as printed circuit 54. Dome switch 56 may have a dome-shaped biasing member that pushes flexible display 14 outward in direction 60 when the user releases pressure from button member 52. Dome switch 54 and printed circuit 54 may be mounted in support structures 50 behind flexible display 14. Other types of switches may use spring-based biasing members or other biasing structures to bias button members such as button member 52. The use of a dome switch with a dome-shaped biasing structure is merely illustrative.

Providing device 10 with flexible display 14 without the need for an opening in flexible display 14 to access button 17 allows flexible display 14 to extend over button 17 without disruption. In both the FIG. 4 and FIG. 5 configurations, the portion of the flexible display that overlaps the button may be an active display portion or an inactive display portion. When an active display portion is configured so as to overlap buttons and other components, there is generally more area available for the active display portion. The presence of flexible display 14 over button 17 (or other components) may also reduce the risk of moisture or dirt entering into the interior of device 10.

Figure 6:
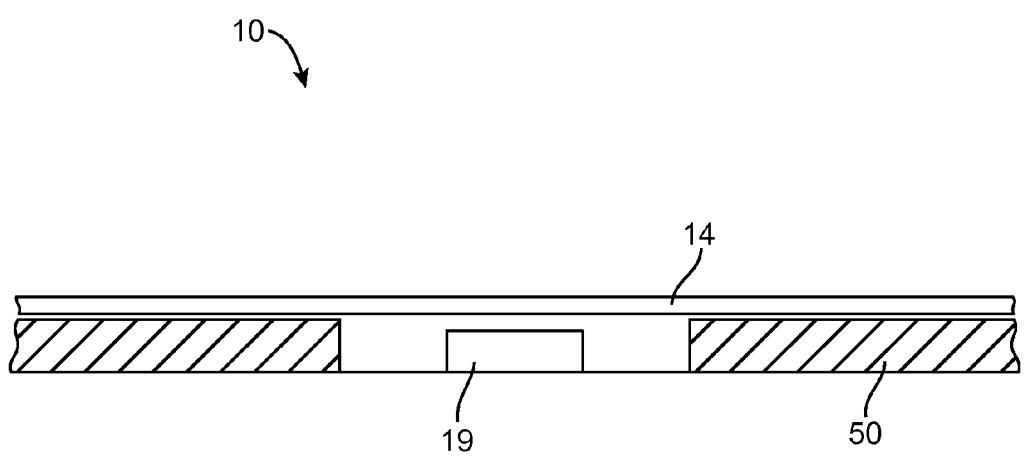
FIG. 6 is a cross-sectional side view of a portion of an illustrative electronic device in the vicinity of an audio component in accordance with an embodiment of the present invention.

FIG. 6 is a cross-sectional side view of a portion of device 10 in the vicinity of audio component 19. Audio component 19 may be recessed in a chassis 50 behind flexible display 14. Audio component 19 may be a speaker for providing sound to a user of device 10 or a microphone for receiving input from a user or the external environment. In the embodiment shown in FIG. 6, sound may be transmitted through flexible display 14 to a microphone or from a speaker. The portion of flexible display 14 that overlaps audio component 19 may be active or inactive. Arrangements in which component 19 is covered with part of the active area of display 14 may allow the size of active region 20A of flexible display 14 to be increased. The presence of flexible display 14 over audio component 19 may also reduce the risk of moisture or dirt entering into the interior of device 10.

Figure 7:
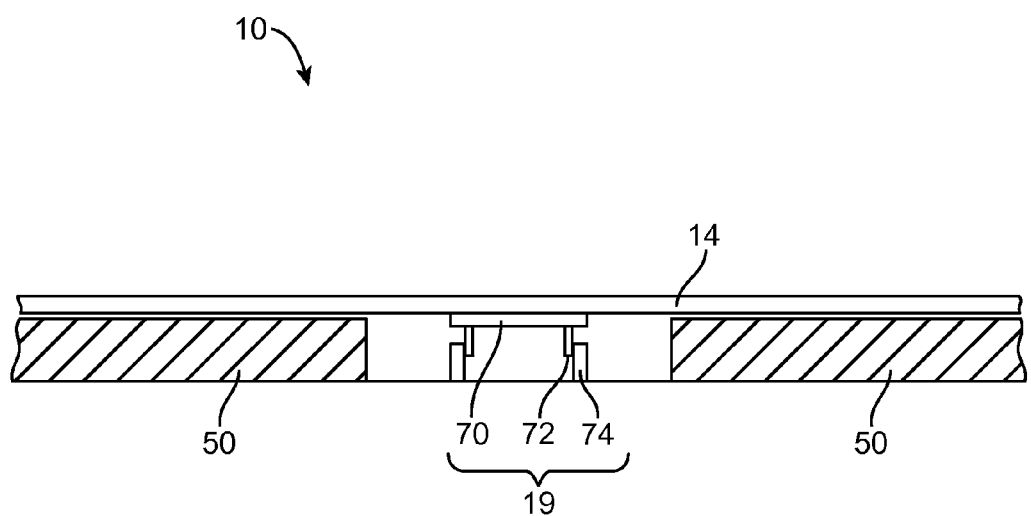
FIG. 7 is a cross-sectional side view of another embodiment of a portion of an illustrative electronic device in the vicinity of an audio component in accordance with an embodiment of the present invention.

FIG. 7 is a cross-sectional side view of a portion of device 10 in the vicinity of another embodiment of audio component 19. In the illustrative embodiment of FIG. 7, audio component 19 may be a speaker or microphone that contains a diaphragm such as diaphragm 70. Diaphragm 70 may be formed from a separate structure that is attached to the underside of flexible display 14 or may be formed from a part of flexible display 14. As in the embodiment shown in FIG. 6, audio component 19 may be mounted within support structures 50. Audio component 19 may include a magnet such as magnet 74 and a coil such as coil 72 in which current may flow. If audio component 19 is a speaker, current may be driven through coil 72 to induce motion in diaphragm 70 and thereby emit sound through flexible display 14. If audio component 19 is a microphone, sound waves originating from the exterior of device 10 may induce vibrations in flexible display 14 which are transmitted to diaphragm 70 and ultimately to coil 72 in which current may be induced. The current produced in coil 72 may be used to transmit sound information to device 10. Diaphragm 70 may be a separate member in contact with flexible display 14 or may be an integral part of flexible display 14.

Figure 8:
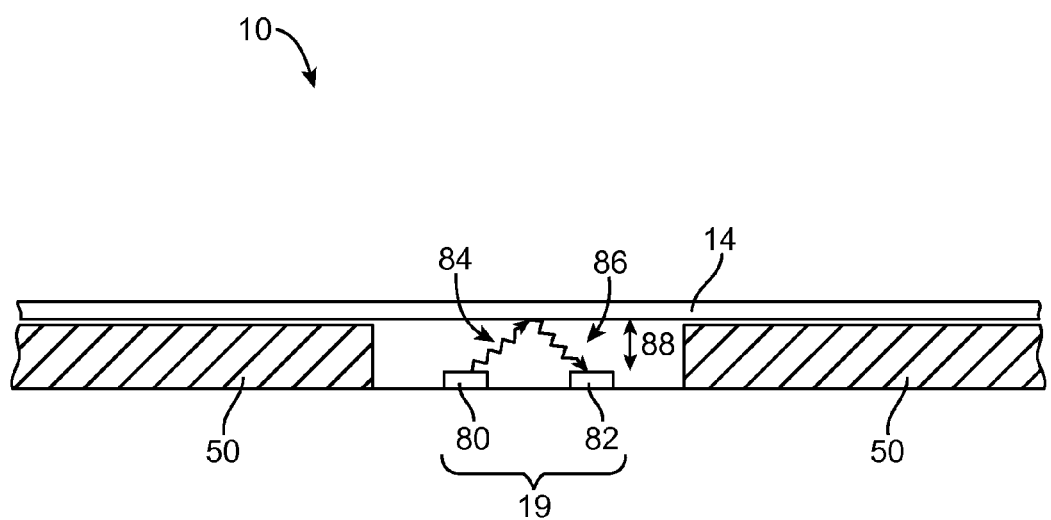
FIG. 8 is a cross-sectional side view of yet another embodiment of a portion of an illustrative electronic device in the vicinity of an audio component in accordance with an embodiment of the present invention.

FIG. 8 is a cross-sectional side view of a portion of device 10 in the vicinity of another possible embodiment of audio component 19. As shown in FIG. 8, audio component 19 may be a laser microphone which uses vibrations in flexible display 14 induced by sound originating external to device 10 to produce an signal to be transmitted to device 10. As shown in FIG. 8, audio component 19 may be recessed in support structures 50. Audio component 19 may include a light emitting component such as laser component 80. Laser component 80 may emit a laser beam such as laser beam 84 in the direction of flexible display 14. Laser beam 84 may reflect off of flexible display 14 and a reflected laser beam such as reflected laser beam 86 may be absorbed by a laser absorbing component 82.

Laser beam 84 and reflected laser beam 86 may be used in combination with laser 80 and photosensitive element 82 to monitor variations in distance 88 from flexible display 14 to component 80 and component 82. Sound waves originating external to device 10 may induce vibrations in flexible display 14 causing distance 88 to oscillate. The oscillations in distance 88 may be converted into sound-related information by device 10.

Figure 9:
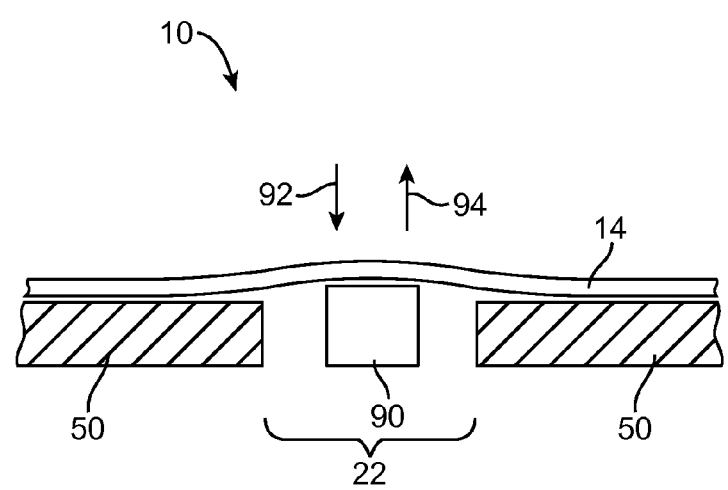
FIG. 9 is a cross-sectional side view of a portion of an illustrative electronic device in the vicinity of an actuator such as a piezoelectric actuator in accordance with an embodiment of the present invention.

FIG. 9 is a cross-sectional side view of a portion of device 10 in the vicinity of a component such as component 22 of FIG. 1. In the embodiment shown in FIG. 9, component 22 may contain an actuator such as a piezoelectric (actuator 90). Piezoelectric actuators such as piezoelectric actuator 90 may vary in shape (e.g., thickness) in response to applied control voltages and may produce an output voltage when compressed (i.e., the piezoelectric element in actuator 90 may serve as a force sensor in addition to serving as a controllable actuator). A user of device 10 may exert force on flexible display 14 in direction 92. Flexible display 14 may be deformed to exert a mechanical pressure on piezoelectric element 90 or other force sensor, inducing a voltage which may be transmitted to device 10. Conversely, piezoelectric actuator 90 may be used to provide tactile feedback to a user of device 10. A voltage difference applied to the surfaces of piezoelectric actuator 90 may induce an expansion of piezoelectric actuator 90. Piezoelectric actuator 90 may then deform flexible display 90 in direction 94 providing tactile feedback to a user of device 10.

Figure 10:
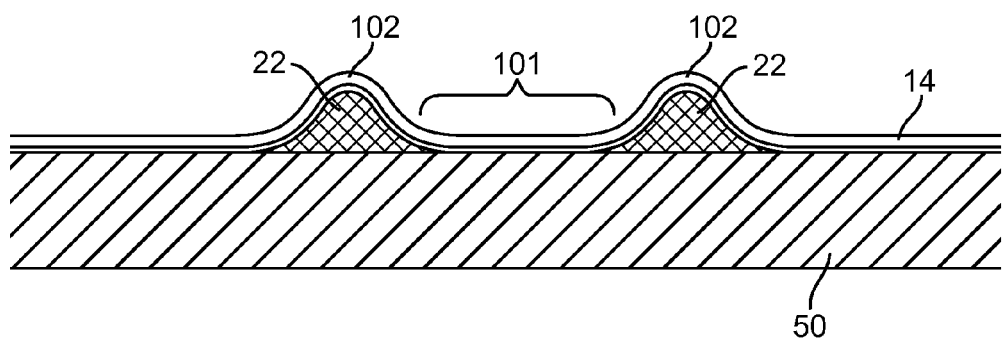
FIG. 10 is a cross-sectional side view of a portion of an illustrative electronic device in the vicinity of an internal structural component in accordance with an embodiment of the present invention.

FIG. 10 is a cross-sectional side view of a portion of device 10 in the vicinity of structural component 22 of device 10. Structural component 22 may cause a permanent deformation such as deformation 102 in flexible display 14 to indicate the location of portion 101 of touch-sensitive layer 14B in display 14 to the user of device 10. Portion 101 may be, for example, a letter key or other button in a virtual keypad (keyboard) displayed on flexible display 14. A touch sensor array associated with display 14 may be used to gather user input (i.e., the touch sensor array may be used to determine when a user has pressed the virtual key associated with portion 101). The location of portion 101 may also be indicated visually using associated display pixels in flexible display 14. At times, a user may desire to be able to locate portion 101 without having to look at flexible display 14. Deforming flexible display 14 in the vicinity of portion 101 using structural component 22 may allow a user to locate portion 101 without visual aid. Structural component 22 may be an isolated component indicating the location of a single portion 101 of touch-sensitive layer 14B or may be one of an array of components 22 indicating the locations of an array of portions 101 (e.g., the array of letter, number, and symbol keys in a virtual keypad displayed on display 14). Structural component 10 may be a separate component mounted to support structures 50 or may be an integral part of support structures 50.

Figure 11:
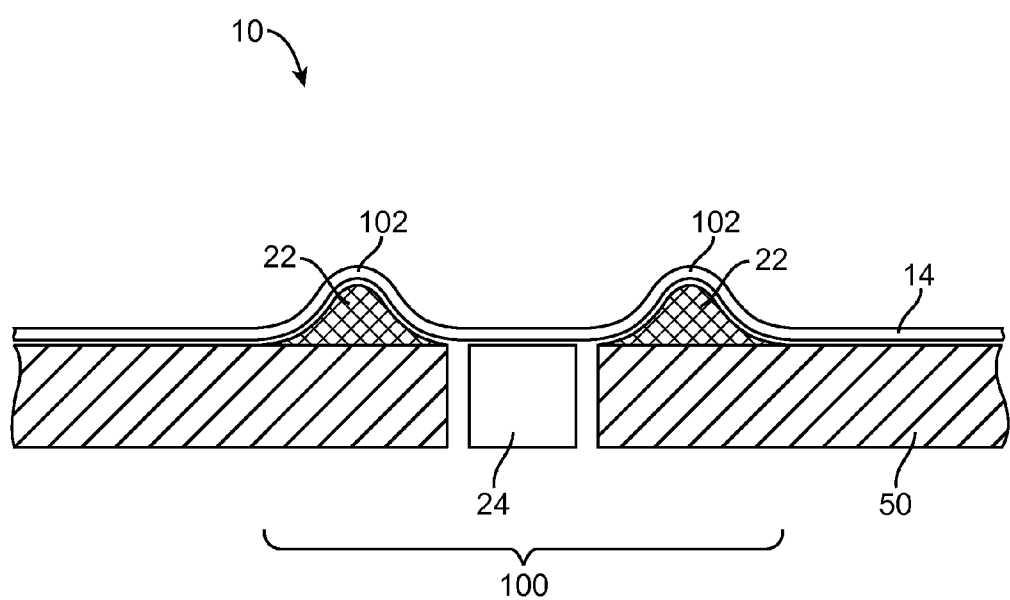
FIG. 11 is a cross-sectional side view of a portion of an illustrative electronic device in the vicinity of a combined internal interface component in accordance with an embodiment of the present invention.

FIG. 11 is a cross-sectional side view of a portion of device 10 in the vicinity of a hybrid component such as component 100. Component 100 may include both an internal interface component such as internal component 24 and a structural component such as structural component 22. Structural component 22 may cause a permanent deformation such as deformation 102 in flexible display 14 in the vicinity of internal component 24 to indicate the location of internal component 22 to the user of device 10. The presence of flexible display 14 between the user of device 10 and internal component 24 may obscure the location of internal interface component 24. The location of interface component 24 may be indicated visually using display pixels in flexible display 14. The deformation of flexible display 14 in the vicinity of interface component 24 using structural component 22 may also allow the user to locate interface component 24 without visual aid. Component 100 may be an isolated component indicating the location of a single interface component 24 of touch-sensitive layer 14B or may be one of an array of components 100 indicating the locations of an array of interface components 24.

Figure 12:
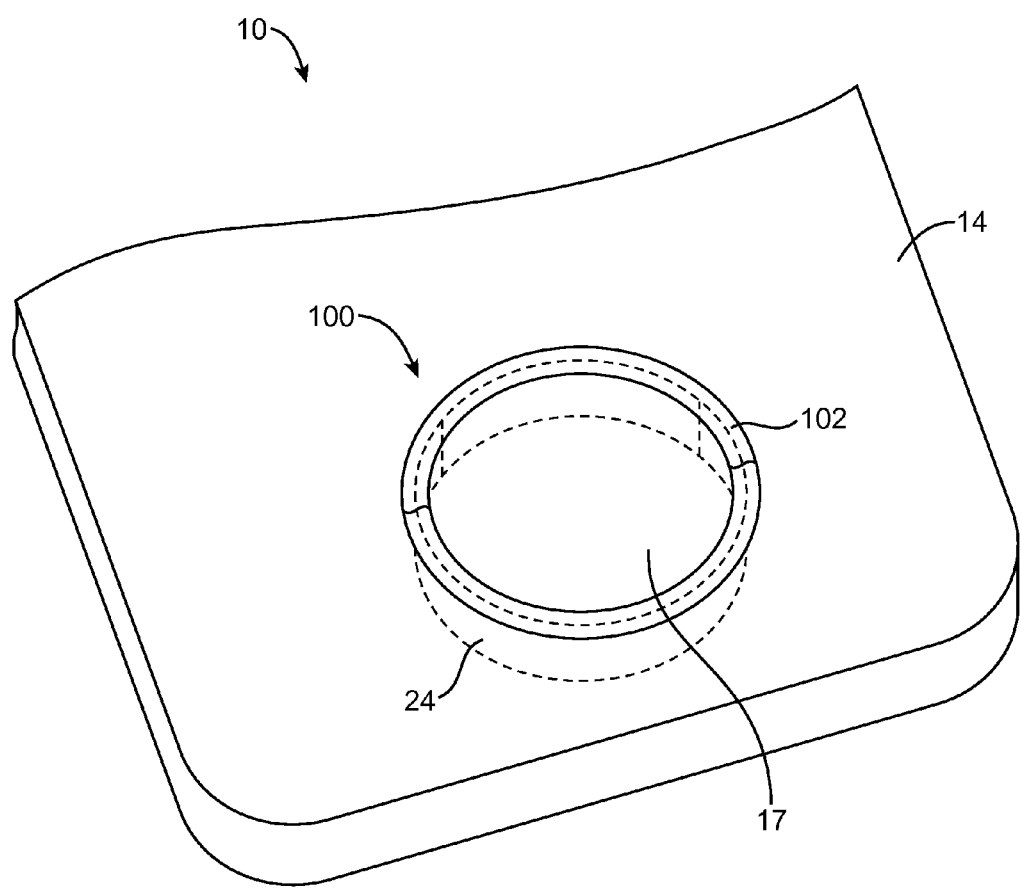
FIG. 12 is a perspective view of a portion of an illustrative electronic device with a flexible display and a combined internal interface component in accordance with an embodiment of the present invention.

FIG. 12 is a perspective view of an embodiment of device 10 in which internal component 24 is a button such as button 17. In the embodiment of FIG. 12, as in FIG. 11, component 100 includes internal component 24 and structural component 22 (shown in FIG. 11). As shown in FIG. 12, a ridge or other deformation such as deformation 102 in flexible display 14 may be used to indicate the location of button 17.

Figure 13:
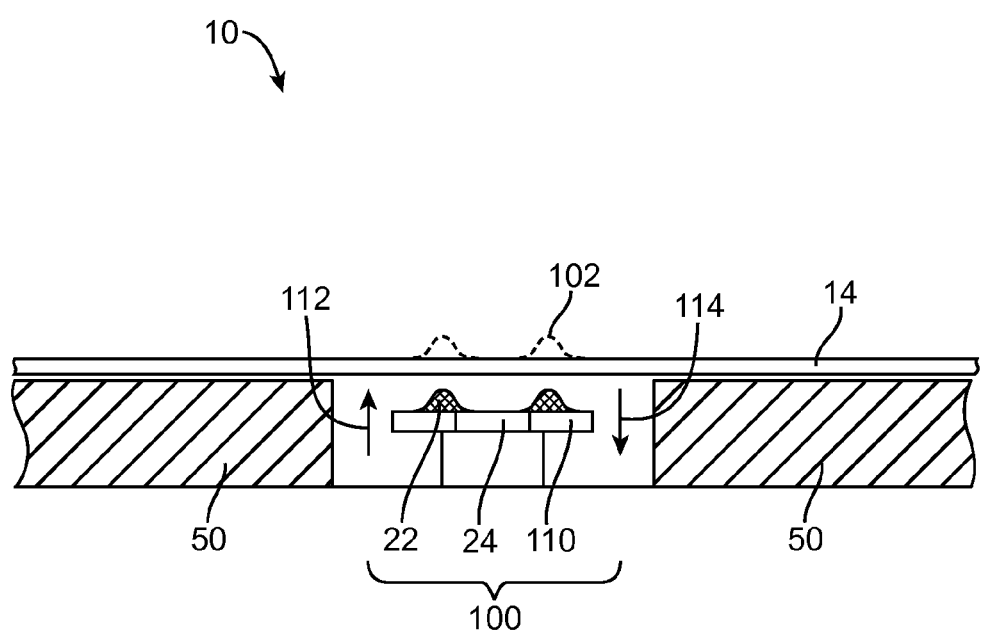
FIG. 13 is a perspective view of a portion of an illustrative electronic device with a flexible display and a combined internal interface component mounted to actuator stage in accordance with an embodiment of the present invention.

FIG. 13 is a cross-sectional side view of a portion of device 10 in the vicinity of another illustrative embodiment of a hybrid component such as component 100 which includes an internal interface component such as internal component 24 and a structural component such as structural component 22 mounted to an actuator such as actuator stage 110. Component 100 may be recessed in chassis 50. Actuator stage 110 may be electrically or mechanically raised in direction 112 to temporarily produce deformations such as deformations 102 in flexible display 14. Deformations 102 in flexible display 14 may indicate the location of internal interface device 24 to a user of device 10. Actuator stage 110 may be electrically or mechanically lowered in direction 114 to remove deformations 102 in flexible display 14 returning flexible display 14 to its original shape. Component 100 may be an isolated component indicating the location of a single interface component 24 of touch-sensitive layer 14B or may be one of an array of components 100 indicating the locations of an array of respective interface components 24.

Figure 14:
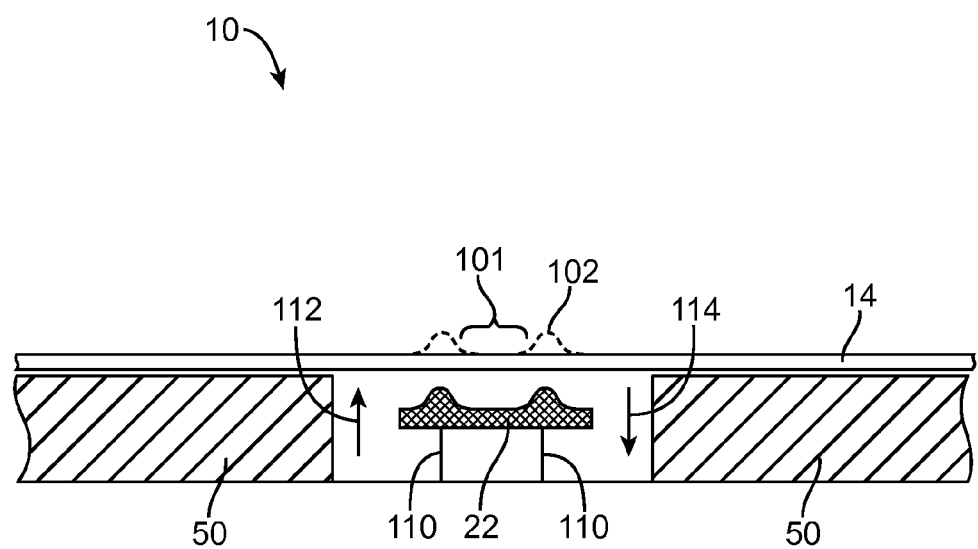
FIG. 14 is a cross-sectional side view of a portion of an illustrative electronic device in the vicinity of an internal structural component mounted to an actuator stage in accordance with an embodiment of the present invention.

FIG. 14 is a cross-sectional side view of a portion of device 10 in the vicinity of another illustrative embodiment of a component such as structural component 22. In the arrangement of FIG. 14, structural component 22 is mounted an actuator such as actuator stage 110. Some modes of operating device 10 may require visual interaction with a user of device 10 (e.g., a mode involving the display of images or video). In these visual modes, the location of portion 101 of touch-sensitive layer 14B of flexible display 14 may be indicated visually using display pixels in flexible display 14.

In other modes of operation of device 10, a user of device 10 may wish to determine the location of portion 101 without visual aid. In the embodiment shown in FIG. 14, component 22 may be recessed in support structures 50. Actuator stage 110 may be electrically or mechanically raised in direction 112 to move structural component 22 into contact with flexible display 14 to temporarily produce deformations such as deformations 102 in flexible display 14. Deformations 102 may indicate the location of portion 101 to a user of device 10. When no longer needed for tactile interaction (e.g., upon switching to a video display mode), actuator 110 may be electrically or mechanically moved in direction 114 to lower structural component 22 and remove deformations 102 in flexible display 14.

Figure 15:
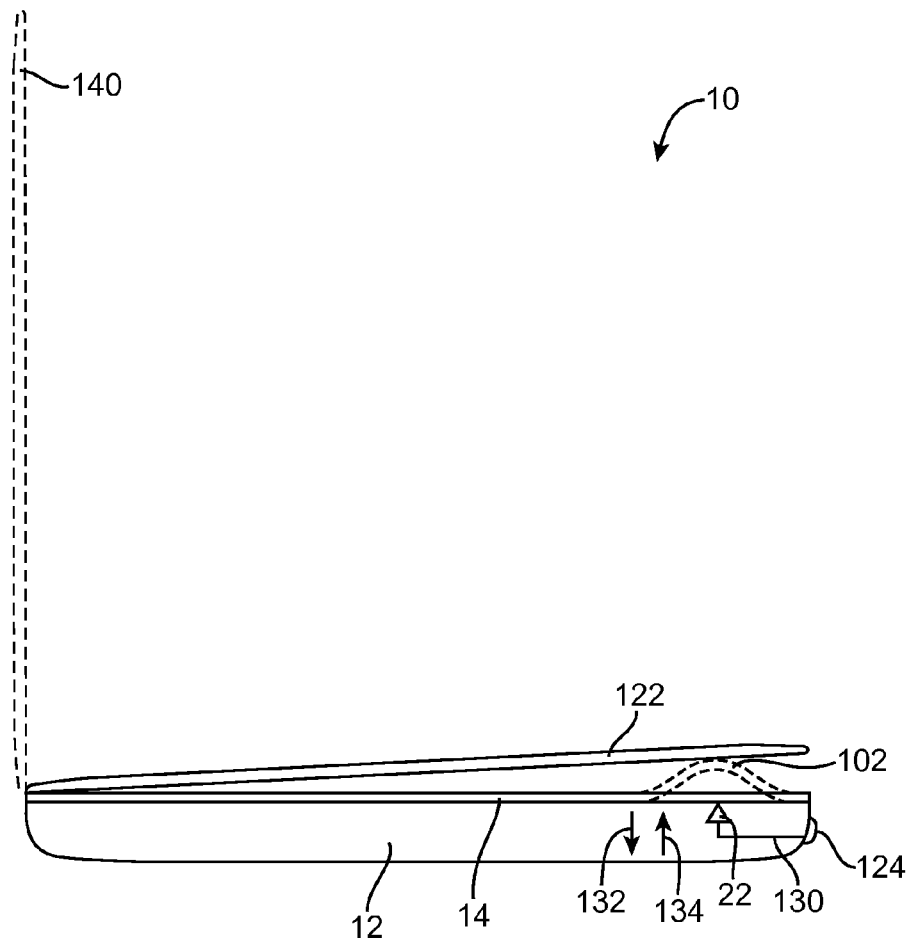
FIG. 15 is a cross-sectional side view of a portion of an illustrative electronic device with a cover and an internal structural component mounted to an actuator in accordance with an embodiment of the present invention.

FIG. 15 is a cross-sectional side view of an embodiment of device 10 in which device 10 includes housing 12 and cover member 122. Cover member 122 may be formed of plastic, glass, ceramics, fiber composites, metal (e.g., stainless steel, aluminum, etc.), other suitable materials, or a combination of these materials. Cover member 122 may be a single structure or may include multiple cover structures. In order to facilitate lifting of cover 122 by a user of device 10, structural component 22 may be coupled to an actuator 130 which may be used to lift structural component 122 in direction 134. When lifted, structural component 134 may cause a deformation such as deformation 102 in flexible display 14. Flexible display 14 may exert a pressure on cover member 122, lifting cover member 122 in direction 134 allowing the user to grip cover member 122 in order to lift cover member 122 to an open position such as open position 140. Actuator 130 may then be used to lower structural component 22 in direction 132 in order to allow flexible display 14 to return to its original shape. Actuator 130 may be activated in response to a control signal produced by the user using actuator switch 124 or by a control signal from other suitable control circuitry.

Figure 16:
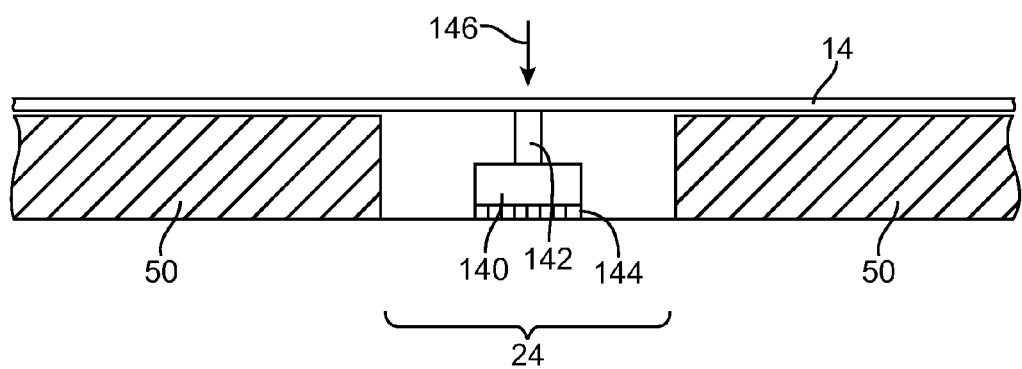
FIG. 16 is a cross-sectional side view of a portion of an illustrative electronic device in the vicinity of a pressure sensor in accordance with an embodiment of the present invention.

FIG. 16 is a cross-sectional side view of a portion of device 10 in the vicinity of another illustrative embodiment of internal interface component 24. In the embodiment shown in FIG. 16, interface component 24 may be a pressure sensor that includes a pressure sensing module 140. Pressure sensing module 140 may be coupled between a contact member such as contact member 142 (which is in contact with flexible display 14) and electrical contacts 144. Pressure may be exerted on flexible display 14 (e.g., by a user of device 10 or due to atmospheric pressure changes in the surrounding environment of device 10). Pressure exerted on flexible display 14 may be transmitted to pressure sensing module 140 by contact member 142. Pressure information may be transmitted to device 10 through electrical contacts 144. Pressure sensing module 140 may sense pressure changes using piezoelectric, capacitive, inductive, resistive, optical or other mechanisms. Providing device 10 with flexible display 14 allows flexible display 14 to extend over interface component 24, increasing the area of active region 20A of flexible display 14. The presence of flexible display 14 over interface component 24 may also reduce the risk of moisture or dirt entering into the interior of device 10.

The foregoing is merely illustrative of the principles of this invention and various modifications can be made by those skilled in the art without departing from the scope and spirit of the invention.

What is claimed is:

1. An electronic device, comprising:
    a flexible display; and
    an internal component, wherein the flexible display is configured to be deformed by an action external to the device, wherein deformation of the flexible display creates a response from the internal component when the deformation is aligned with the internal component, wherein the flexible display further comprises a rigid cover layer having at least one opening, wherein the rigid cover layer substantially covers the flexible display, and wherein the at least one opening is aligned with the internal component.

2. The electronic device defined in claim 1 wherein the flexible display comprises:

a flexible display layer; and a touch-sensitive layer.

3. The electronic device defined in claim 2 wherein the flexible display layer of the flexible display includes an active display region, and wherein the internal component is covered with a portion of the active display region of the flexible display.

4. The electronic device defined in claim 3 wherein the internal component comprises a button, and wherein deformation of the flexible display compresses the button.

5. The electronic device defined in claim 4 wherein the opening comprises a hole in the rigid cover layer, wherein the button further comprises a button member in the opening, wherein the button member moves within the hole in the rigid cover layer, and wherein the movement of the button member in the opening causes deformation of the flexible display.

6. An electronic device, comprising:

a flexible display; and an internal component, wherein the flexible display may be deformed by an action external to the device, wherein deformation of the flexible display creates a response from the internal component, wherein the internal component comprises a laser microphone for detecting a sound originating external to the electronic device, and wherein detecting the sound comprises with a laser, detecting deformation of the flexible display.

7. An electronic device, comprising:

a housing;

a flexible display mounted on the housing;

a first internal component mounted under a portion of the flexible display, wherein the first internal component is configured to deform the portion of the flexible display;

an actuator;

an external cover member; and an actuator switch coupled to the actuator, wherein deformation of the flexible display exerts a pressure on the external cover member, and wherein the pressure on the external cover member lifts the external cover member.

8. The electronic device defined in claim 7, wherein the external cover member comprises aluminum.

9. The electronic device defined in claim 7, wherein when the external cover member is in an open position, the actuator is configured to move the first internal component out of contact with the flexible display.

* * * * *